April 30, 1940. G. H. SCHIEFERSTEIN 2,199,084
ANTIVIBRATION SUSPENSION FOR VEHICLES
Filed Sept. 9, 1937   2 Sheets-Sheet 1
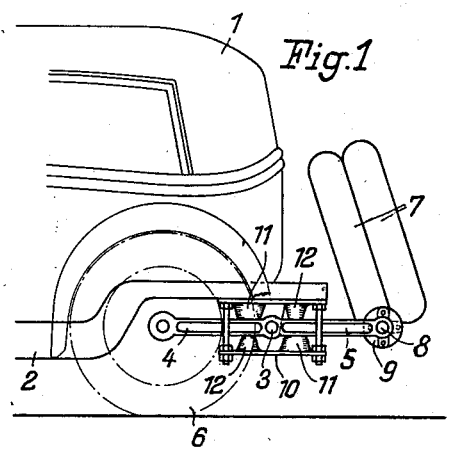
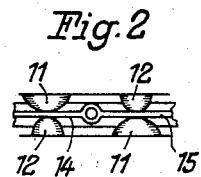
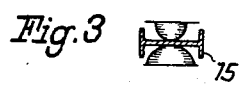
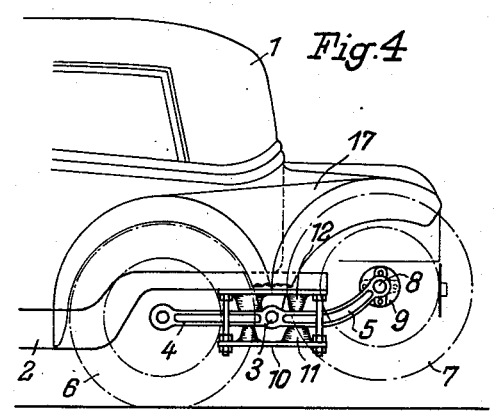
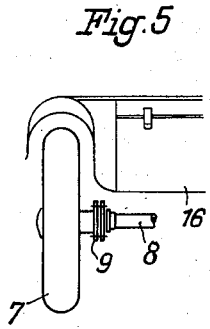
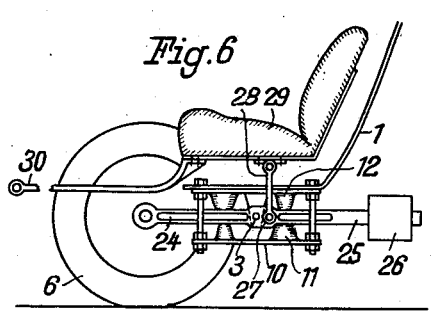
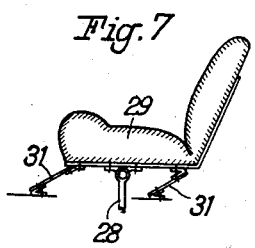
Inventor:
Georg Heinrich Schieferstein
By [signature]
his ATT'Y.

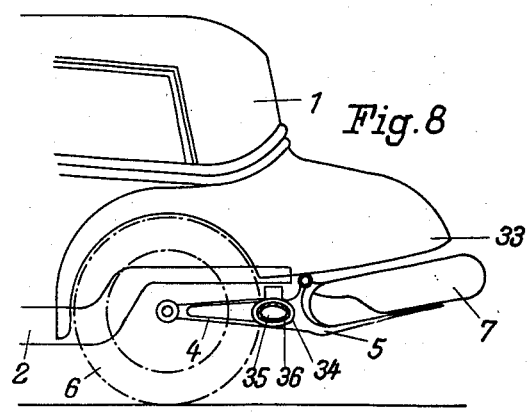

Patented Apr. 30, 1940

2,199,084

UNITED STATES PATENT OFFICE 2,199,084

ANTIVIBRATION SUSPENSION FOR VEHICLES

Georg Heinrich Schieferstein, Berlin-Charlottenburg, Germany

Application September 9, 1937, Serial No. 163,109
In Germany May 9, 1936

6 Claims. (Cl. 267—21)

This invention relates to an antivibration suspension for vehicles.

Protecting the bodies of vehicles from the shocks produced by inequalities in the road surface is a particularly difficult matter because not only do six different oscillations occur—viz., three rotational oscillations about the three spatial axes, and three oscillations parallel thereto—but because the shocks occur in an extremely irregular manner, so that the laws of oscillation are inapplicable to such irregular oscillations.

Means for vehicular suspension are known in which a wheel connected, by springs, with the chassis of the vehicle is attached to a two-armed lever, the central point of which is mounted on the chassis, and the second arm is provided with a counterweight, so that, in consequence, a rising movement of the wheel is accompanied with a corresponding downward movement of the counterweight, and vice versa. This arrangement damps the vibrations in the body of the vehicle, but is still far from completely suppressing said vibrations.

The present invention is based upon the observation that only an exactly controllable and pre-calculated oscillatory system can also transform the irregular shocks into controllable oscillations; and, with this object, the invention provides suspension means consisting of a rockable member mounted on the body to be sprung and usually in the form of a two-armed lever carrying, on the one hand the wheel, or other supporting member, and on the other a counterweight, the arrangement being such that these two parts are balanced, statically and, as far as possible, dynamically through the resilient means, and in which the upwardly directed mass movements and forces are, in all circumstances, opposed by equal and downwardly directed mass movements and forces. The oscillatory system thus constituted by the oscillating member, with its masses and springs, has an oscillation node—that is a natural point of repose—in its pivotal point and, accordingly, the attached body of the vehicle also remains at rest, without receiving any upward or downward impulses. At the same time, the suspension merely transmits to the body of the vehicle a torque about a transverse axis, which, however, by reason of the usual considerable length and mass inertia of the vehicle, has no effect.

Since, within the controllable movements of the lever, the retarding and accelerating forces for the oscillation of the lever are very high, the resilient means preferably consists of members of progressively increasing resistance, such as—on the one hand—of spherical segments of rubber, or of substitutes thereof, or—on the other hand—in particular, of ellipsoid annular members, which are stressed in torsion. In this manner the amplitude of oscillation increases in a progressively diminishing degree, even in the case of very powerful shocks, and, even then, the oscillations always remain under control without being disturbed by hard impacts of the lever at the ends of its stroke.

A series of other constructional details, more fully described hereinafter, are also of value to the invention.

In the accompanying drawings, the invention is illustrated diagrammatically and by way of example.

Fig. 1 is an elevation of the rear portion of a motor vehicle with the suspension according to the invention;

Fig. 2 is a detail of a modification;

Fig. 3 is a cross section of Fig. 2;

Fig. 4 is an elevation of the rear portion of a motor vehicle with a modification of the suspension;

Fig. 5 is a rear elevation of same;

Fig. 6 is a partial elevation of the rear portion of a vehicle, with special suspension for the seat;

Fig. 7 is an elevation of a modified detail of same;

Figs. 8 and 9 are, respectively a side elevation and plan of another embodiment;

Fig. 10 is a plan of a modification of same; and

Figs. 11 and 12 are, respectively, a rear and side elevation of details of Figs. 8—10.

In Fig. 1, a car body 1 is mounted on a chassis 2 which carries a transverse pin 3 for each back wheel (and also for the front wheels, if desired). Mounted on each pin 3 is a two-armed lever 4, 5, carrying on the forward end, a road wheel and, on the rear end, a counterweight in the form of two spare wheels 7. The spare wheels 7 are secured on a tube 8 attached, at both ends, to the rear arms 5 of the levers by means of Cardan discs 9. In this manner, both arms 4 and 5 of the lever are uniformly loaded and, since both are of the same length, the centre of oscillation is situated in the pin 3.

The resilient means of this oscillatory system consists of two powerful rubber buffers 11 located between the chassis 2 and a counterplate 10 attached thereto, said buffers being disposed symmetrically in relation to the link 3 and supporting the allotted portion of the weight of the car; and of two weaker also symmetrical rubber opposite directions, resilient means adapted to offer a progressively increasing resistance under pressure and holding said rocking member normally in a predetermined position with respect to said body, a road wheel connected to one arm of said rocking member, a counterweight rigidly carried by the other arm, said counterweight comprising a spare wheel and having a weight and leverage to balance the mass of said first arm and connected road wheel statically and, as far as possible, dynamically, and a streamlined casing on said body, said road wheel and counterpoising spare wheel being jointly housed under said casing to lessen the air resistance.

3. An antivibration suspension for vehicles, comprising a rocking member mounted on the body to be protected against vibration and having two arms adapted to swing up and down in opposite directions, resilient means adapted to offer a progressively increasing resistance under pressure and holding said rocking member normally in a predetermined position with respect to said body, a road wheel connected to one arm of said rocking member and a counterweight rigidly carried by the other arm, said counterweight comprising a spare wheel arranged to form a bumper and having a weight and leverage to balance the mass of said first arm and connected road wheel statically and, as far as possible, dynamically.

4. An antivibration suspension for vehicles, comprising a rocking member mounted on the body to be protected against vibration and having two arms adapted to swing up and down in opposite directions, resilient means adapted to offer a progressively increasing resistance under pressure and holding said rocking member normally in a predetermined position, said resilient means comprising ellipsoidal annular elements of elastic material and metal fittings applied to the inner and outer surfaces of said annular elements to form a rocking pivot subject to torsion, a road wheel connected to one arm of said rocking member, and a counterweight rigidly carried by the other arm, said counterweight having a weight and leverage to balance the mass of said first arm and connected road wheel statically and, as far as possible, dynamically.

5. An antivibration suspension for vehicles, comprising two rocking members mounted on opposite sides of the body to be protected against vibration, each rocking member having two arms adapted to swing up and down in opposite directions, resilient means adapted to offer a progressively increasing resistance under pressure and holding said rocking members normally in predetermined positions with respect to said body, a road wheel connected to one arm of each rocking member, a transverse rod attached Cardanwise to the other ends of both rocking members, and loading members mounted on said transverse rod to form a counterweight for the two road wheels, said counterweight having a weight and leverage to balance the masses of said first arm and connected road wheels statically and, as far as possible, dynamically.

6. An antivibration suspension for vehicles, comprising a rocking member mounted on the body to be protected against vibration and having two arms adapted to swing up and down in opposite directions, resilient means adapted to offer a progressively increasing resistance under pressure and holding said rocking member normally in a predetermined position with respect to said body, a road wheel connected to one arm of said rocking member, and a counterweight rigidly carried by the other arm, said counterweight comprising a spare wheel located close behind said road wheel and having a weight and leverage to balance the mass of said first arm and connected road wheel statically and, as far as possible, dynamically.

GEORG HEINRICH SCHIEFERSTEIN.